(12) United States Patent
Pachler et al.

(10) Patent No.: US 10,484,050 B2
(45) Date of Patent: Nov. 19, 2019

(54) NEAR FIELD COMMUNICATION RING

(71) Applicant: Infineon Technologies AG, Neubiberg (DE)

(72) Inventors: Walther Pachler, Graz (AT); Josef Gruber, St. Ruprecht an der Raab (AT); Juergen Hoelzl, Graz (AT); Stephan Rampetzreiter, Graz (AT)

(73) Assignee: INFINEON TECHNOLOGIES AG, Neubiberg (DE)

( * ) Notice: Subject to any disclaimer, the term of this patent is extended or adjusted under 35 U.S.C. 154(b) by 0 days.

(21) Appl. No.: 15/901,950

(22) Filed: Feb. 22, 2018

(65) Prior Publication Data

US 2018/0248586 A1  Aug. 30, 2018

(30) Foreign Application Priority Data

Feb. 27, 2017  (DE) .................. 10 2017 104 046

(51) Int. Cl.
*H04B 5/00* (2006.01)
*H04B 1/03* (2006.01)
*A44C 9/00* (2006.01)
*H04B 7/08* (2006.01)

(52) U.S. Cl.
CPC ......... *H04B 5/0031* (2013.01); *A44C 9/0053* (2013.01); *H04B 5/005* (2013.01); *H04B 5/0056* (2013.01); *H04B 5/0081* (2013.01); *A44C 9/003* (2013.01); *H04B 7/0854* (2013.01)

(58) Field of Classification Search
CPC .. H04B 5/0031; H04B 5/0056; H04B 5/0081; H04B 5/005; H04B 7/0854; H04B 5/0025; H04B 1/03; A44C 9/003; A44C 9/0053
See application file for complete search history.

(56) References Cited

U.S. PATENT DOCUMENTS

| 2009/0085751 A1* | 4/2009 | Sakama ................. G06K 19/04 340/572.7 |
| 2010/0052859 A1* | 3/2010 | Lossau ............. G06K 19/07749 340/10.1 |
| 2016/0156603 A1* | 6/2016 | Janik .................... H04L 63/0492 726/7 |
| 2016/0196487 A1* | 7/2016 | Huynh ............. G06K 19/07762 63/1.11 |
| 2016/0283934 A1* | 9/2016 | Cheng ................ G06Q 20/3278 |
| 2016/0308583 A1* | 10/2016 | Hsu ....................... H04B 5/0025 |
| 2016/0336630 A1* | 11/2016 | Coleman ................. H01P 1/068 |
| 2016/0350581 A1* | 12/2016 | Manuel ............. G06K 9/00087 |

FOREIGN PATENT DOCUMENTS

DE  19824643 A1  11/1999

OTHER PUBLICATIONS

German Office Action based on Application No. 10 2017 104 046.3 (6 pages) dated Jul. 12, 2019 (for reference purpose only).

* cited by examiner

*Primary Examiner* — Andrew Wendell
(74) *Attorney, Agent, or Firm* — Viering, Jentschura & Partner MBB

(57) ABSTRACT

A near field communication ring configured to be worn by a user is provided. The NFC ring may include at least one metal ring having a gap, a chip, and an antenna, wherein the chip and the antenna may be fixed to the at least one metal ring having a gap, and wherein the chip, using the antenna, is configured to provide a near field communication with an external device.

13 Claims, 9 Drawing Sheets

FIG. 3
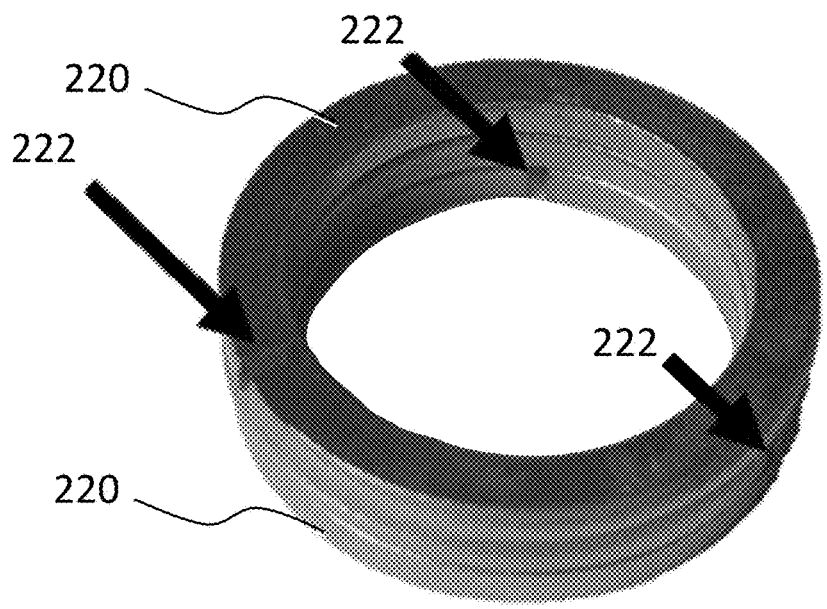
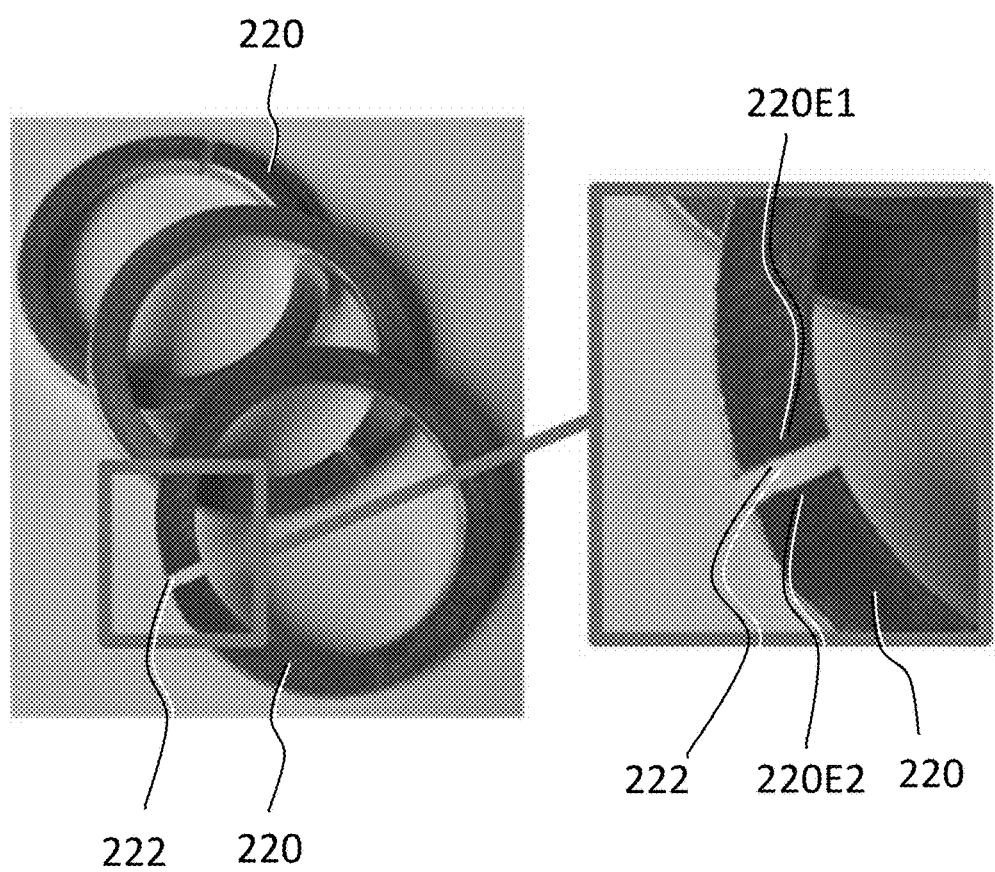

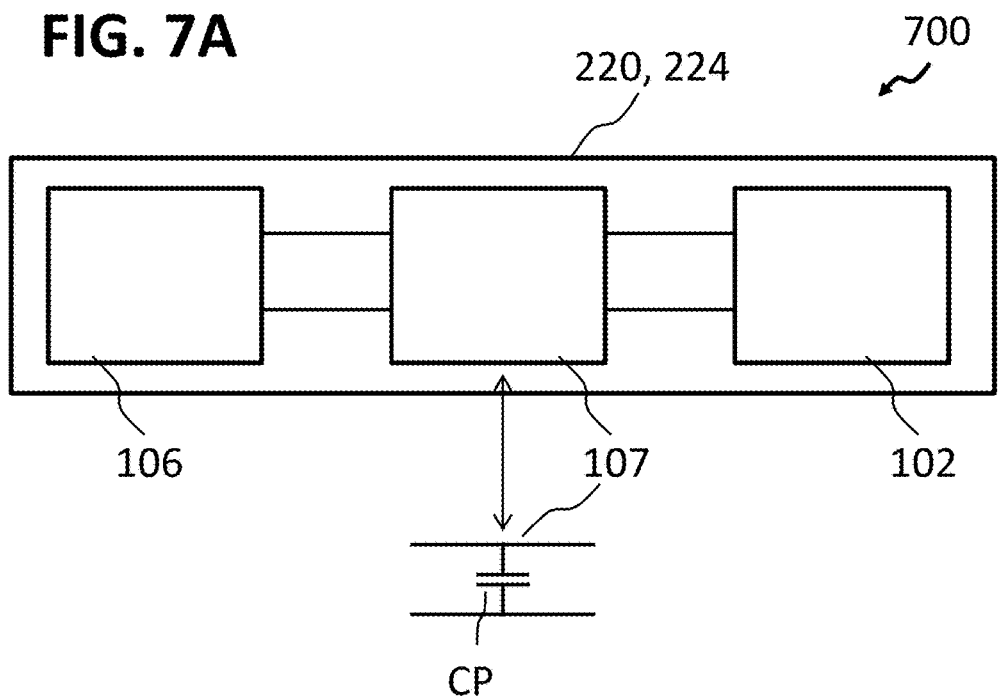
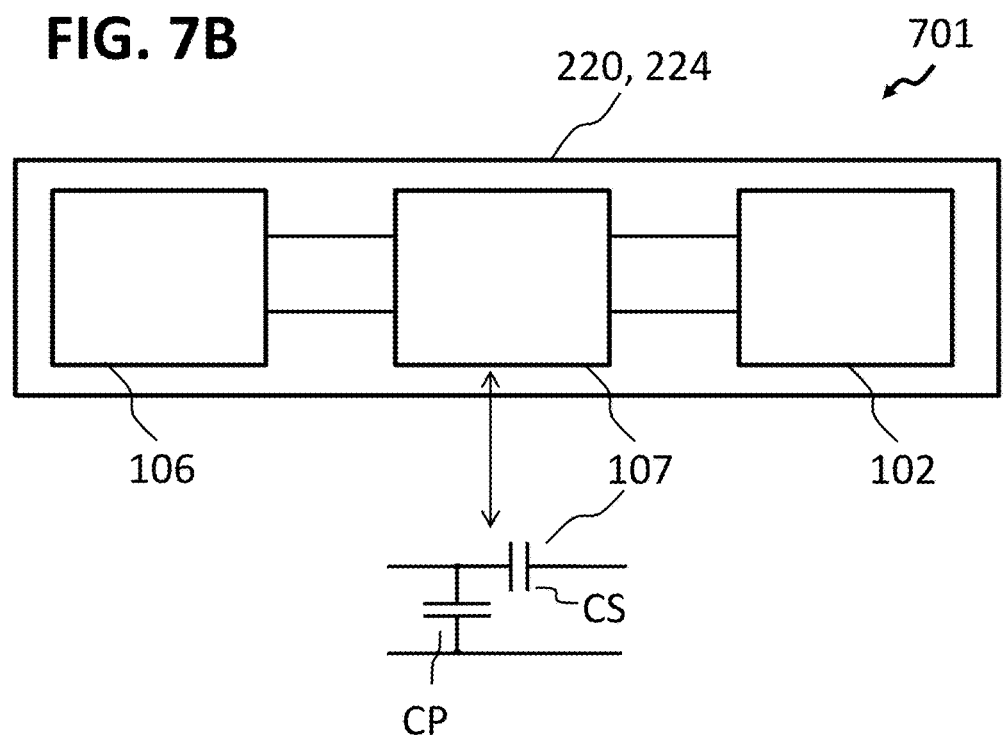

NEAR FIELD COMMUNICATION RING

CROSS-REFERENCE TO RELATED APPLICATION

This application claims priority to German Patent Application Serial No. 10 2017 104 046.3, which was filed Feb. 27, 2017, and is incorporated herein by reference in its entirety.

TECHNICAL FIELD

Various embodiments relate generally to a near field communication ring.

BACKGROUND

Recently, an execution of payments, authentication, and other functions with wearable devices has become more and more attractive. According to recent surveys, a ring as a payment device has been seen as the most important and popular form factor. In contrast to other wearables, e.g. watches, a ring may include no electronics. Therefore, there may be no power supply available. A passive payment solution may be required. At present, several near field communication (NFC) ring products are available. However, they may not be optimized in design and performance. Several improvements may be possible.

As shown in FIG. 1 (which shows a standard antenna design having a rectangular flex print soldered into a ring form factor), a core of a state of the art NFC-ring form factor may consist of a standard flex-print PCB that may realize a coil antenna. The flex print technology may offer several advantages. It may for example serve as an NFC chip carrier, with a chip being attached to a flex print using standard bonding, flip chip, or the like, may allow a realization of very precise antenna parameters, may provide a technically robust technology, may be cheap in mass production, and may allow to use a non-conductive carrier, e.g. a plastic carrier.

However, up to now, there is no reasonably cheap robust high-performance NFC ring available.

SUMMARY

A near field communication (NFC) ring configured to be worn by a user is provided. The NFC ring may include at least one metal ring having a gap, a chip, and an antenna, wherein the chip and the antenna may be fixed to the at least one metal ring having a gap, and wherein the chip, using the antenna, is configured to provide a near field communication with an external device.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 3 shows perspective views of metal rings of an NFC ring in accordance with various embodiments, and a zoomed-in perspective view of a gap in the metal ring;

FIG. 7A and FIG. 7B each show a schematic circuitry of an NFC ring in accordance with various embodiments.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

Various aspects of the disclosure are provided for devices, and various aspects of the disclosure are provided for methods. It will be understood that basic properties of the devices also hold for the methods and vice versa. Therefore, for sake of brevity, duplicate description of such properties may have been omitted.

Figure 1:
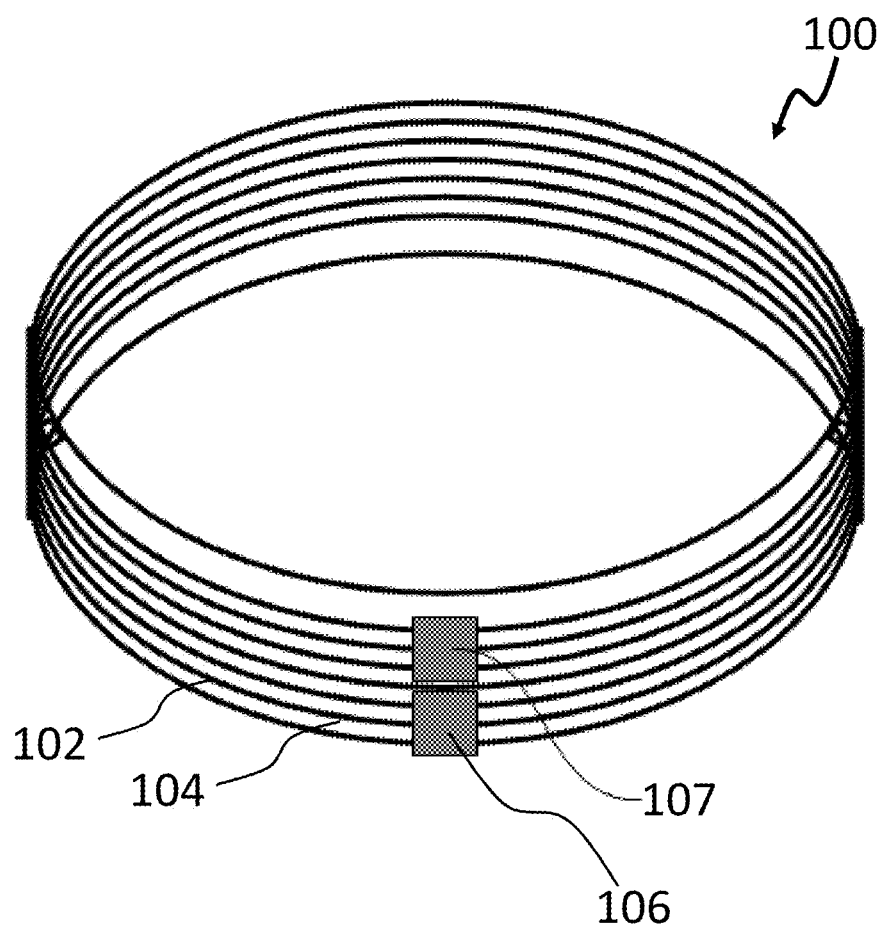
FIG. 1 shows a schematic perspective view of a common NFC ring.

FIG. 1 shows a schematic perspective view of a common NFC ring 100. The common NFC ring 100 may include an antenna 102, which may be arranged on a carrier 104.

The common NFC ring 100 may further include a chip 106, e.g. a semiconductor chip 106 and a matching portion 107, which may allow for an easier matching of antenna parameters to a desired specification.

Some common NFC rings 100 may further include an encapsulation, e.g. a plastic and/or ceramics encapsulation (not shown here, but see e.g. FIG. 5), encapsulating the chip 106 and the antenna 102, e.g. for mechanic stabilization, protection from environmental influence (e.g. humidity, dust, grease, etc.), and possibly also for aesthetic reasons.

Common NFC rings 100, may, however, have various disadvantages. For example, they may relatively easily get damaged. For example, an NFC ring 100 with a ceramics encapsulation may be likely to break when dropped (thereby possibly also destroying the antenna and/or the chip), a plastic encapsulation may get scratched.

Using metal as a body material of the NFC ring may solve the above described problems, such that metal may be regarded as an optimal material for a ring (e.g. an NFC ring), e.g. due to its solidity and/or its aesthetic appearance. However, a solid (e.g. ring-shaped) metal may be damping a magnetic field, such that having the antenna and the chip attached to the metal body may decrease an NFC performance of the NFC ring. For example a higher field strength may be required for the communication, and/or a load modulation amplitude may be diminished as compared to a common NFC ring 100 without the metal body. Eddy currents induced in the ring may be responsible for the decrease in performance.

To overcome this problem, in various embodiments, small isolation gaps may be formed in the metal ring that may reduce this effect. In the metal ring including the isolation gaps, no reversed polarity magnetic field may be generated, such that a damping influence of the metal may be prevented. However, a small gap may also reduce a robustness (and possibly also an aesthetic appearance) of the ring.

To solve this problem too, in various embodiments, stacked edged metal rings may be provided, wherein the stacked rings may be isolated from one another using an isolation layer. In various embodiments, in order to achieve a maximum robustness, the gap may be arranged at a different circumferential position for each of the stacked rings.

In various embodiments, an NFC ring that is made out of metal, essentially consists of metal or includes metal is provided, wherein the NFC ring may not include ferrite. As the metal, any metal except ferrite may be used, for example common metal ring materials like silver, gold, platinum or titanium, or other metals like copper, palladium, aluminum, or others. Furthermore, the metal may include combinations (e.g. alloys) of metals, e.g. an alloy including gold, silver, and/or copper, or any other combination of metals.

In various embodiments, the near field communication ring may be configured to be worn by a user. For example its size, e.g. its diameter (e.g. its inner diameter and its outer diameter, which determine a thickness of the ring), and its width parallel to a cylinder axis of the ring may be configured such that a user can for example wear the NFC ring on a finger.

In various embodiments, an NFC ring with a body including or (e.g. essentially) consisting of metal may be provided. The body may include at least one metal ring having a gap. The metal ring having the gap may also be referred to as open metal ring or as metal ring with isolation gap, or, in cases where it is clear that a metal ring of an embodiment is referred to, only as "metal ring", even though in that case it is to be understood that the metal ring has the gap. The gap in the metal ring may be formed in such a way that the metal ring is completely opened by the gap, e.g. in such a way that no closed electrically conductive ring structure is formed. The metal ring may in various embodiments have a first end and a second end that may be separated by the gap.

Thereby, an induction of eddy currents in a closed-loop-conductor metal ring by external magnetic fields, which would decrease a performance of the NFC ring, may be avoided.

In various embodiments, the NFC ring may further include a chip and an antenna connected to the chip. The chip may be configured to provide a near field communication using the antenna. The near field communication may include a set of communication protocols that enable the NFC ring and an external electronic device to establish communication by bringing them within close distance (usually a few centimeters) from each other.

In various embodiments, the NFC ring may further include a matching portion, also referred to as matching network, matching circuit or matching element, which may allow for an easier and/or better matching of antenna parameters, e.g. a resonance frequency, to predefined parameters, thereby facilitating a production and/or improving a performance of the NFC ring. In other embodiments, the matching of the antenna parameters, e.g. the resonance frequency, to the predefined parameters may be obtained without the matching portion.

In various embodiments, the antenna, which may be an antenna coil, may be formed as a solenoid or as a flat spiral coil.

In various embodiments, the gap may include one or more materials, wherein at least one of the materials may be electrically insulating and arranged in the gap in such a way that an electrically conductive connection between the first end and the second end of the metal ring through the gap is avoided.

In various embodiments, the gap may be used as a protection. For example, the gap may be arranged to protect the chip and its connection to the antenna. For example, the chip may be arranged in the gap. Thereby, the chip may be protected from mechanical hazards like for example an impact on the chip, or a shearing off of the chip from the ring body.

In various embodiments, the metal structure, i.e. the open metal ring, may be arranged around or below the chip and/or the antenna, or be used as encapsulation for the chip and/or the antenna. In other words, the metal ring with the gap may be used to protect the chip and/or the antenna, for example it may provide a very robust casing for the chip and/or the antenna.

In various embodiments, the NFC ring may include a plurality of metal rings, each of the metal rings having a gap.

In various embodiments, the plurality of metal rings having the gap (which may be considered as forming metal layers) may be arranged around and/or below the chip and/or the antenna, or be used as encapsulation for the chip and/or the antenna In various embodiments, the plurality of metal rings having the gap (i.e., the metal rings with isolation gaps) may be arranged with an isolation layer between each ring pair. In other words, each of the metal rings with the gap of the plurality of metal rings with the gap that may otherwise be in contact with a further metal ring with the gap of the plurality of metal rings with the gap may have an isolation layer arranged such that an electrically conductive contact between the metal ring and the further metal ring may be avoided.

The isolation layer may in various embodiments be configured to fix the adjacent metal rings to each other, e.g. as an electrically isolating adhesive, e.g. an electrically isolating glue.

In various embodiments of the NFC ring including the plurality of metal rings having the gap, the rings may be arranged such that their respective gaps are arranged in different circumferential positions of the NFC ring. In other words, each of the gaps may have an angular offset with respect to at least one of the other gaps. For example, the angular offset(s) may be equidistant. In an exemplary case of the NFC ring including three metal rings having the gap, the rings may be arranged such that their respective gaps are arranged with a separation of about 120° between adjacent pairs of gaps. In various embodiments, the separations between the gaps may have any other suitable value.

Figure 2A:
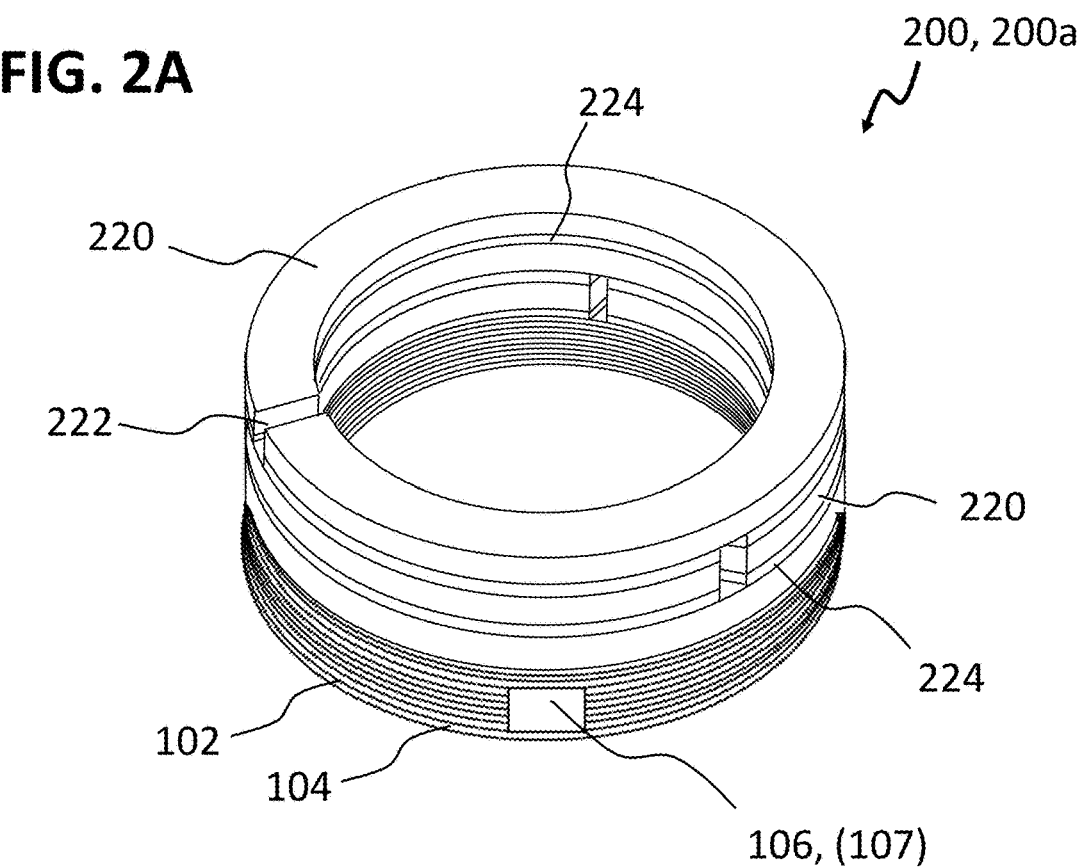
FIG. 2A and FIG. 2B each show a perspective view of an NFC ring in accordance with various embodiments.
Figure 2B:
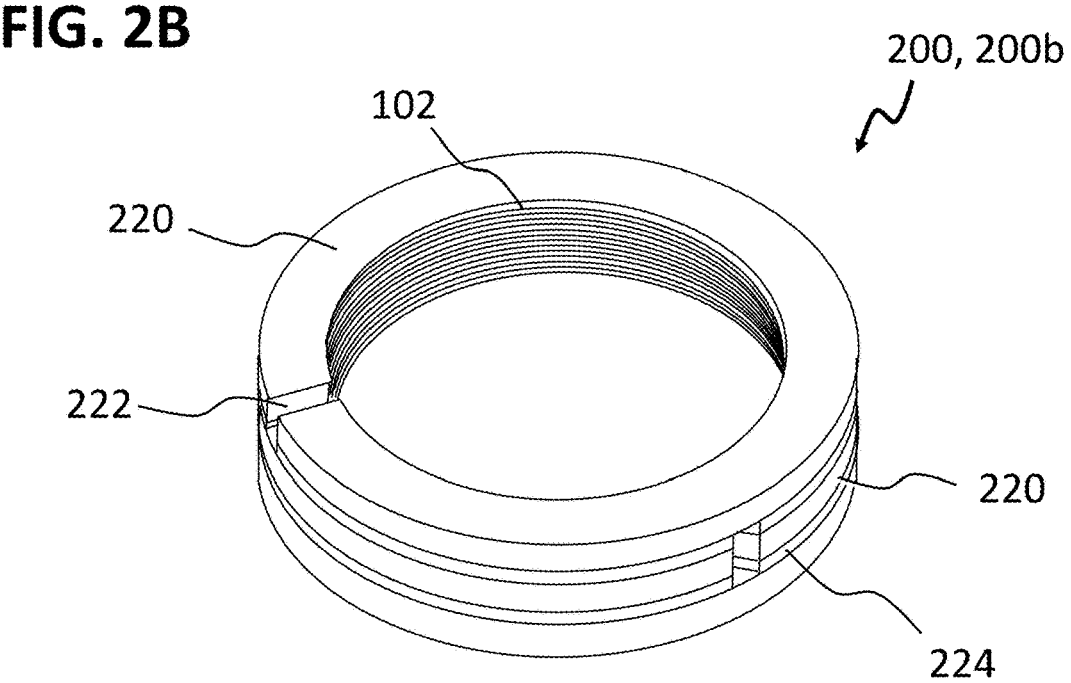
Figure 4:
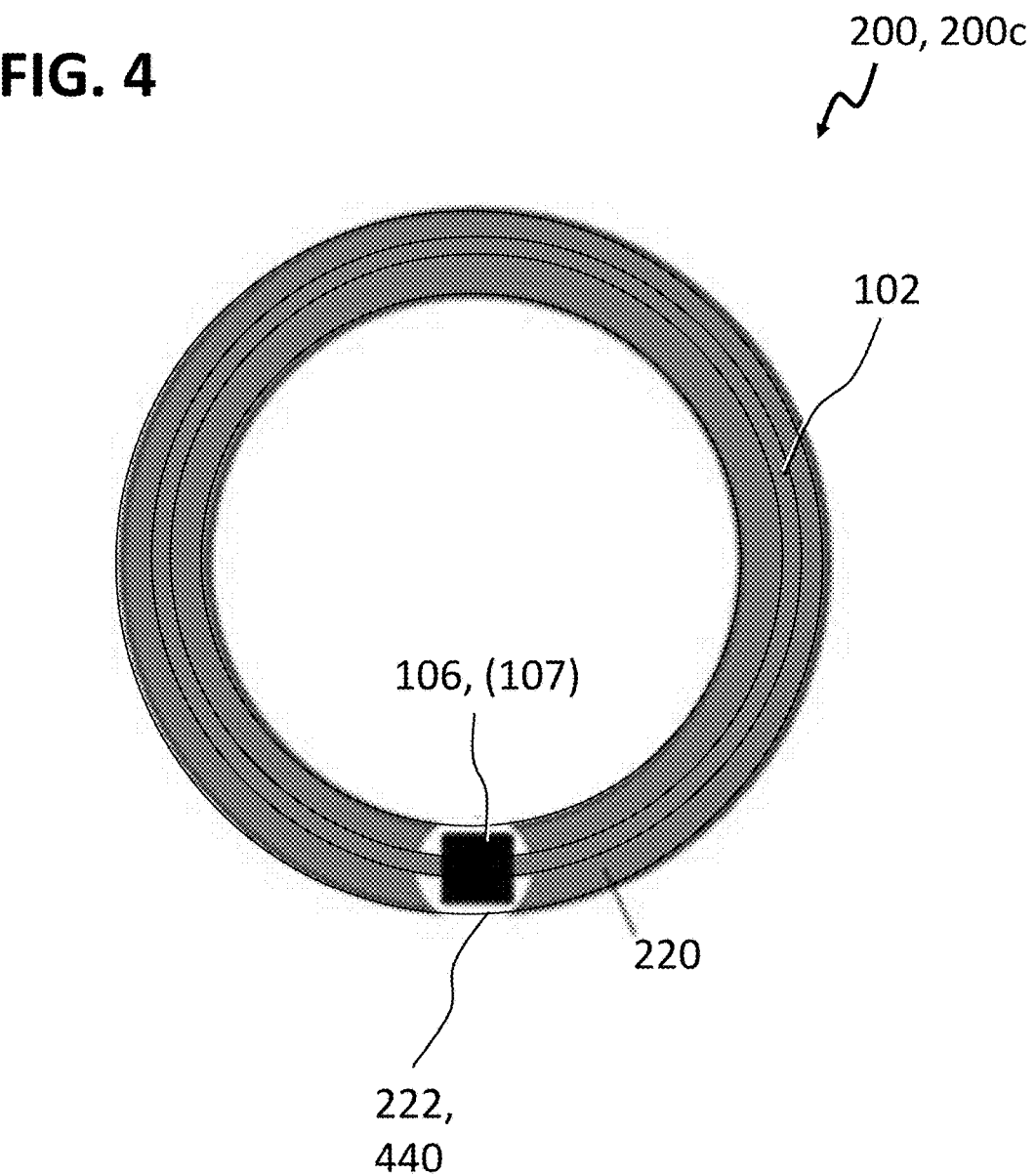
FIG. 4 shows a schematic view of an NFC ring in accordance with various embodiments.

FIG. 2A and FIG. 2B each show a perspective view of an NFC ring 200a and 200b, respectively, in accordance with various embodiments. FIG. 3 shows perspective views of metal rings of an NFC ring in accordance with various embodiments, and a zoomed-in perspective view of a gap in the metal ring, and each of FIGS. 4 and 6A to 6F shows a schematic view of an NFC ring 200 in accordance with various embodiments.

In various embodiments, the near field communication ring 200 may include at least one metal ring 220 having a gap 222, a chip 106, and an antenna 102, wherein the chip 106 and the antenna 102 may be fixed to the metal ring 220 having the gap 222. For example, the chip 106 and the antenna 102 may be fixed directly or indirectly to the metal ring 220 having the gap 222.

In various embodiments, the chip 106 may be configured to provide a near field communication with an external device. For establishing the near field communication with the external device, the chip 106 may be configured to use the antenna 102. The chip 106 may for example be connected, e.g. electrically conductively connected, with the antenna 102.

The chip 106 may in various embodiments be similar or identical to a chip 106 as used in a common NFC device. The chip 106 may for example be a semiconductor chip 106 that may be configured to provide a protocol that may be required for the near field communication.

In various embodiments, the antenna 102 may be similar to an antenna 102 as known in the art, for example regarding a material (e.g. copper or aluminum), a thickness and/or separation of individual windings, resonance frequency, method of forming the antenna 102, method of forming a coupling between the antenna 102 and the chip 106, and the like.

In various embodiments, the NFC ring 200 may include a matching portion 107. As shown in FIG. 7A and FIG. 7B, each showing a schematic circuitry 700 and 701, respectively, of an NFC ring 200 in accordance with various embodiments, the matching portion 107 may for example include a parallel capacitor CP connected in parallel between the chip 106 and the antenna 102 (as shown in FIG. 7A), or for example a serial capacitor CS connected in series to the antenna 102 in combination with the parallel capacitor CP (as shown in FIG. 7B). In other embodiments, the matching of the antenna parameters, e.g. the resonance frequency, to the predefined parameters may be obtained without the matching portion 107 (thus the matching portion 107 is shown in parantheses in the figures).

Figure 5:
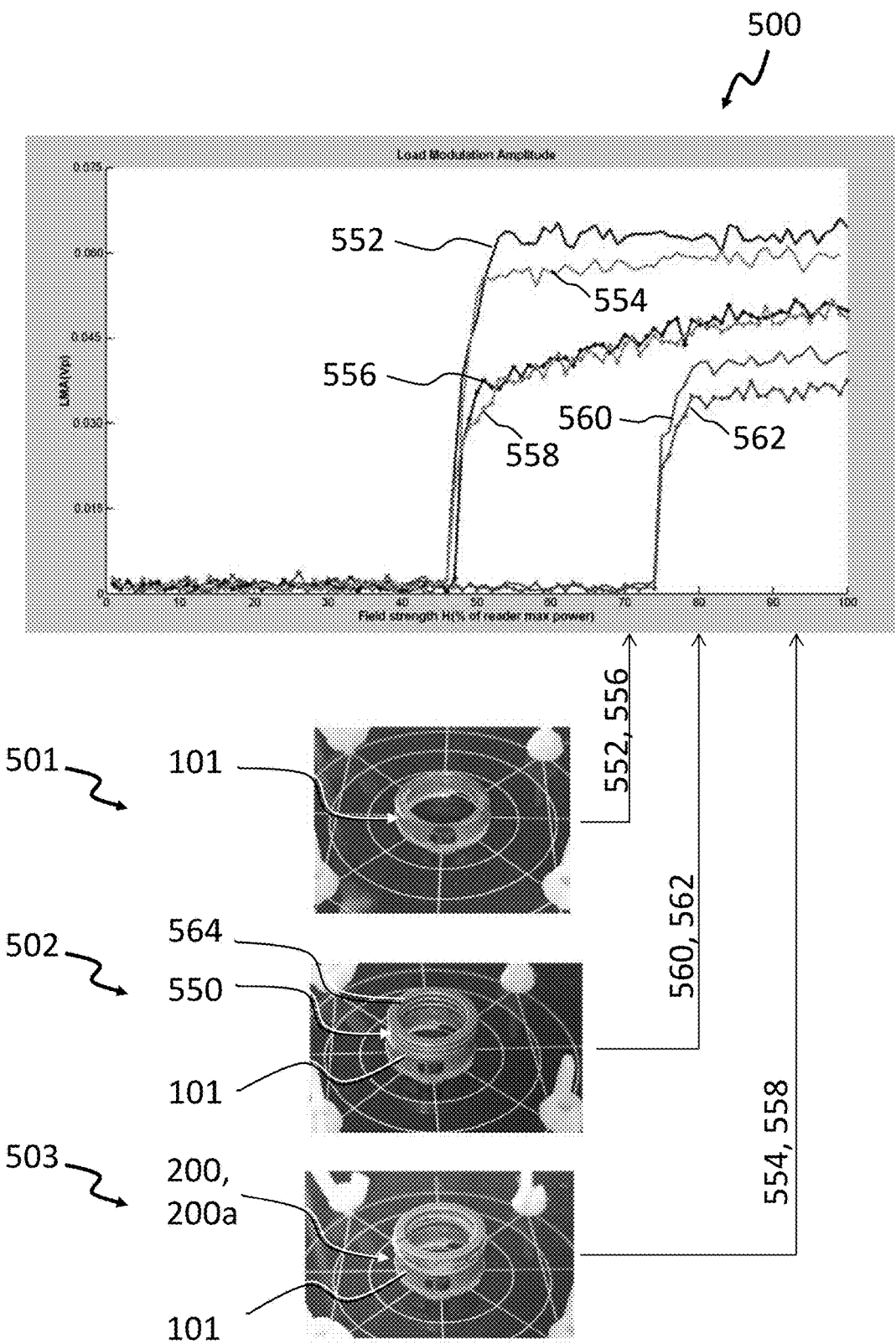
FIG. 5 shows test measurement arrangements for measuring a load modulation amplitude and results of test measurements of the load modulation amplitude.

In various embodiments, the antenna 102 may be formed as a solenoid (e.g. on a cylindrical inner surface of the NFC ring, e.g. as shown in FIGS. 2A, 2B, 6A and 6B; in principle, the antenna 102 may, alternatively or additionally, be arranged on a cylindrical outer surface of the NFC ring or above or below the at least one metal ring 220, e.g. as shown in the NFC ring 220a as shown in FIG. 2A and FIG. 5, however, such arrangements may be aesthetically less satisfying than arrangements in which the antenna 102 is concealed) or as a flat spiral coil, (e.g. as shown in FIGS. 4, 6C, 6D and 6F; for simplicity, in some of the drawings, windings of the coil may be represented by circles, but are to be understood as forming a coil).

In various embodiments, the antenna 102 may have two ends, each of which may be electrically conductively connected to the chip 106, e.g. using connections 662, as for example shown in FIGS. 6A to 6E. In various embodiments, the antenna 102 may be formed as a closed coil having a coupling region, and the chip 106 may be arranged in the coupling region for inductively coupling to the antenna 102. The chip 106 may be configured for the inductive coupling, e.g. by including a second antenna, e.g. as known in the art.

In various embodiments, the metal ring 220 having the gap 222 may consist of a metal, wherein any metal except ferrite may be used, for example common metal ring materials like silver, gold, platinum or titanium, or other metals like copper, palladium, aluminum, or others. Furthermore, the metal may include combinations (e.g. alloys) of metals, e.g. an alloy including gold, silver, and/or copper, or any other combination of metals.

In various embodiments, the gap 222 may be formed in the at least one metal ring 220, for example by directly forming the metal ring 220 with the gap 222, e.g. using founding or other known suitable methods, or by first forming the at least one metal ring 220 as a closed metal ring and thereafter removing a portion of the metal ring located in the gap 222, e.g. by sawing, laser cutting, or any other suitable method known in the art.

Figure 6A:
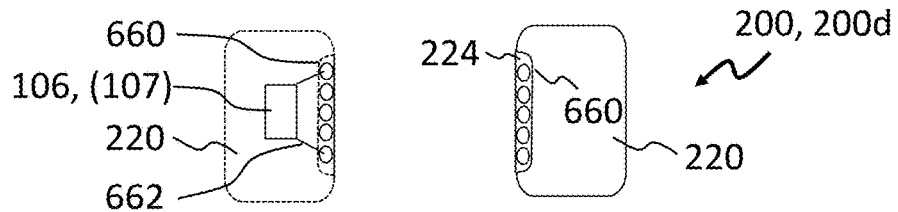
FIG. 6A to 6F each show a schematic view of an NFC ring in accordance with various embodiments.
Figure 6B:
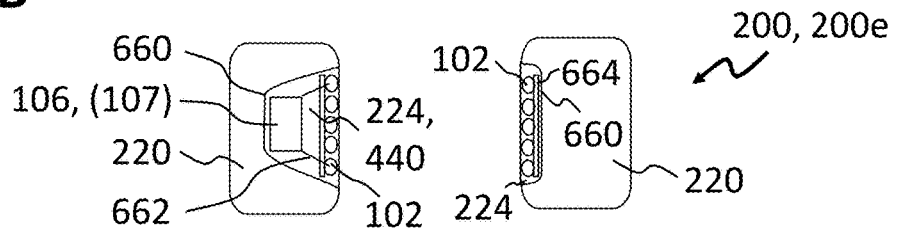

In various embodiments, one or more recesses (e.g. openings) that may be foreseen in the at least one metal ring 220, e.g. a recess for arranging the chip 106 and/or the antenna 102 therein, e.g. a recess 660 as shown in FIG. 6A and FIG. 6B, may be also formed directly when forming the at least one metal ring 220, and/or may be formed later by removing respective portions of the metal ring 220.

In various embodiments, the gap 222 may be formed such that the at least one metal ring 220 is an open ring having a first end 220E1 at a first side of the gap 222 and a second end 220E2 at a second side of the gap 222, as e.g. shown in FIG. 3.

In various embodiments, the gap 222 may have a width in a range from about 0.1 mm to about 1 cm, e.g. from about 0.5 mm to about 5 mm.

In various embodiments, the gap 222 may be narrow, for example just large enough to avoid the eddy currents and/or for placing the chip 106 therein, for example with main surfaces of the chip 106 facing the first end 220E1 and the second end 220E2 of the at least one metal ring 220, for example having a width in a range from about 0.1 mm to about 2 mm.

Figure 6C:
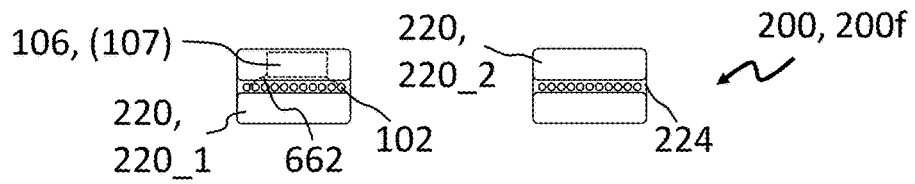
Figure 6D:
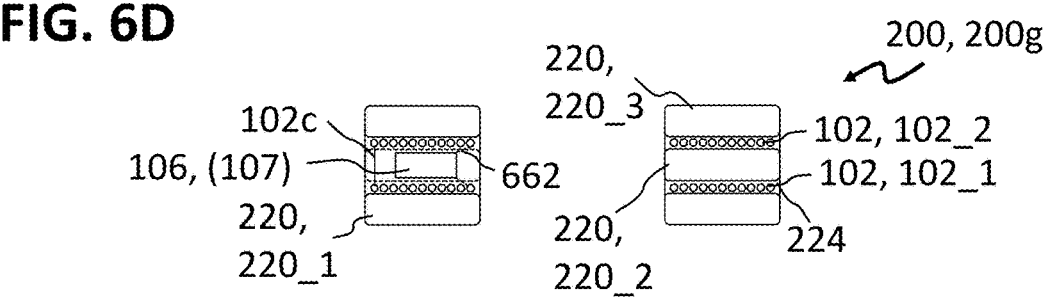
Figure 6E:
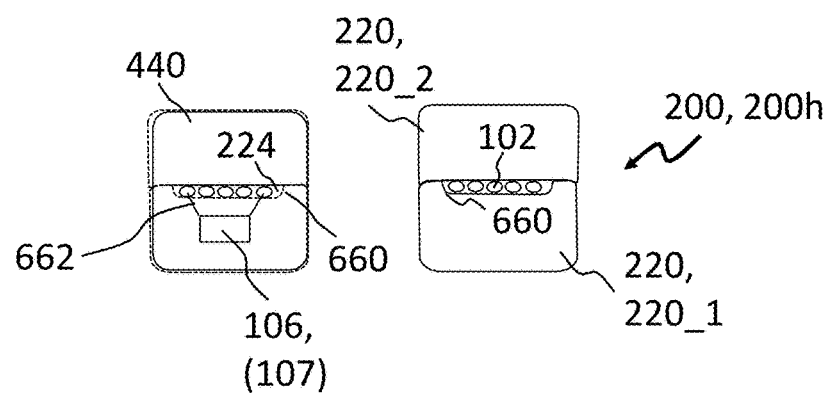
Figure 6F:
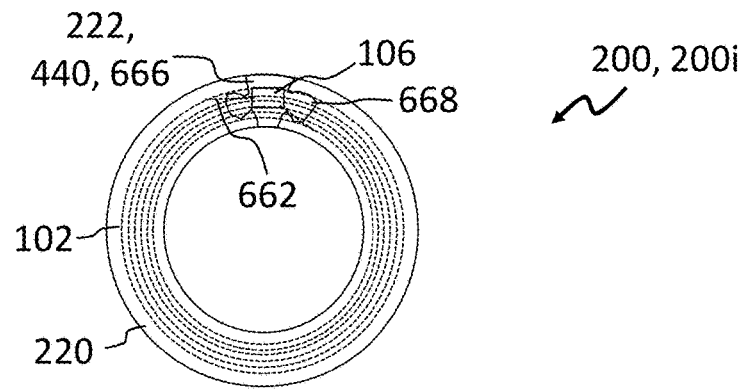

In various embodiments, the gap 222 may be broad, for example broad enough for having a connecting element 666, for example as shown in FIG. 6E, arranged therein.

The connecting element 666 may in various embodiments include connection structures 668 (e.g. as seen in FIG. 6E), for example protrusions, threads, and/or other connection structures as known in the art, which may be matched by corresponding structures formed on the first end 220E1 and the second end 220E2 of the at least one metal ring 220. By arranging the connecting element 666 in the gap 222, a mechanical stability of the at least one metal ring 220, and thereby of the NFC ring 200, may be achieved.

In various embodiments, the connecting element 666 may include or consist of an insulating material 440, which may also be referred to as a filling 440 or as a filling material 440, which may be arranged in the gap 222 in such a way that no electrically conductive connection is formed between the first end 220E1 and the second end 220E2 of the at least one metal ring 220 through the gap 222, even in a case where the connecting element 666 may include an electrically conductive material. For example, as shown in an exemplary embodiment in FIG. 6E, the chip 106 (which may include electrically conductive portions and may, in various embodiments, further include electrically conductive connections 662 or may be surrounded by a coupling portion of the antenna 102) may in various embodiments be arranged in the connecting element 666. However, the insulating material 440 may be arranged between the electrically conductive material that may be arranged in the gap 222 and the metal ring 220, such that no electrically conductive closed ring is formed.

In various embodiments, the electrically insulating material may include a plastic material and/or a ceramic material, or any other suitable electrically insulating material.

In various embodiments, the connecting element 666 may be pre-formed, for example by molding (wherein, in various embodiments, the molded connecting element 666 may serve as an encapsulation for the chip 106), and the pre-formed connecting element 666 may thereafter be arranged, e.g. fixed, in the gap 222. In a case of the chip 106 being arranged inside the connecting element, terminals for connecting the antenna 102 to the chip 106 or to a coupling portion of the antenna 102 may be provided on an outside of the connecting element 666.

In various embodiments, the connecting element 666 may be formed in the gap 222, e.g. by filling the gap 222 (in which optionally the chip 106 may be arranged) with the filling 440, e.g. an electrically insulating mold material.

In various embodiments, e.g. in a case of the at least one metal ring 220 providing sufficient (e.g. mechanical) stability, the gap 222 may remain unfilled or may be filled with a filling material 440 that may serve a main purpose that may be different from providing mechanical stability, e.g. forming a smooth outer surface of the NFC ring 200 and/or holding the chip 106 and/or a portion of the antenna 102 and/or connection terminals in place. This may for example be the case in the embodiment shown in FIG. 4.

In various embodiments, even in the case of the at least one metal ring 220 providing sufficient (e.g. mechanical) stability and/or of the filling 440 being formed as the connecting element 666, the filling material 440 itself may add to the mechanical stability, e.g. by having adhesive properties. The filling material 440 may for example include or consist of an electrically insulating glue.

In various embodiments, the at least one metal ring 220 having a gap 222 may include a plurality of metal rings 220, each of which having a gap 222. In various embodiments, any reasonable number of two or more metal rings 220 that may combine to form an NFC ring 200 having a typical ring-size may be used. An exemplary plurality (in this case three) of metal rings 220, each of which having a gap 222, is shown in FIG. 3, in which also a zoomed-in view of an exemplary gap 222 is shown.

In various embodiments, each of the metal rings 220 may have a central axis, and the plurality of metal rings 220 may be stacked such that the central axes coincide. In other words, the plurality of metal rings 220 may be stacked in such a way that they form a hollow cylinder. Such an arrangement is for example shown in FIG. 3 (top), and exemplary embodiments of NFC rings 200 are shown in FIGS. 2A, 2B, 5, 6C and 6D as NFC rings 200a, 200b, 200f and 200g, respectively.

In various embodiments, by including the plurality of metal rings 220 in the NFC ring 200, a robustness of the NFC ring 200 may be increased, for example by arranging at least two gaps 222 of the plurality of gaps 222 at different circumferential positions of the NFC ring 200. In other words, an angular position of at least two of the gaps 222 present in the NFC ring 200 may be different. Exemplary embodiments of such an arrangement are shown in FIGS. 2A, 2B and 3 (top), where, in a stack of three metal rings 200, the gaps 222 are distributed equidistantly around a circumference of the NFC ring 200a, 200b and the stack of metal rings of FIG. 3, respectively, such that an angular distance between each pair of circumferentially adjacent gaps 222 is approximately 120°.

In various embodiments, the angular distance between circumferentially adjacent gaps 222 may have any value, as long as, in a case of a goal of the arrangement being an increase of robustness, the gaps 222 do not overlap in their circumferential position.

In various embodiments, by including the plurality of open metal rings 220 in the NFC ring 200, an additional protected space may be provided, for example for arranging the antenna 102 and/or the chip 106 therein.

In various embodiments, in a case of an increase of robustness not being desired or necessary, e.g. in a case of a sufficiently robust NFC ring 200 where the plurality of open metal rings 220 is used for providing the protected space, the gaps 222 may be positioned in any way, and even an overlap of all gaps 222 regarding their circumferential position may be possible (possibly even preferred), because a larger space may thereby be available, for example for arranging the chip 106 and/or a connection element 666 in the joined gaps 222.

Such an exemplary arrangement in accordance with various embodiments is shown in FIG. 6E, which is to be understood as a cross-sectional view of an NFC ring 200h taken through the gaps 222 of both open metal rings 220 (for distinguishing them, they are also referred to as 220_1 and 220_2, respectively), wherein, as shown in the left portion of the figure, the cross section also goes through the chip 106 and the connections 662 arranged in the gaps 222 and through the antenna 102 crossing the gap 222 of the first metal ring 220_1. This means that, in the left portion of the figure, the metal rings 220_1, 220_2 would not really show up in the cross-sectional view, and are therefore indicated as a dashed line. Instead, in various embodiments, the filling 440 (which may or may not be formed as a connection element 666) may be crossed by the cross-sectional view, and is therefore shown as a solid line (which is shown slightly offset/smaller than the metal rings 220_1, 220_2 in order to allow distinguishing both elements, whereas in reality the filling may in various embodiments be formed with an outer surface that is flush with an outer surface of the metal rings 220_1, 220_2).

In the NFC ring 220h, the first metal ring 220_1 may have a recess 660 formed in a surface that faces (e.g. contacts) the second metal ring 220_2. The antenna 102 may be arranged in the recess 660, and the second metal ring 220_2 may be arranged above the first ring 220_1 in such a way that the antenna 102 is located in the recess 660 protected by the first metal ring 220_1 and the second metal ring 220_2.

A similar protection of the antenna 102 by the plurality of metal rings 220 may be provided by the NFC rings 200f and 200g shown in FIG. 6C and FIG. 6D, respectively. Here, no recess 660 may be formed for housing the antenna 102. Instead, the antenna 102 may be arranged above a tangential plane that is orthogonal to the cylinder axis of the (e.g. first) metal ring 220 and crosses a topmost surface point of the metal ring 220 (in a case of the metal ring 220 being arranged with its cylinder axis extending in a top-bottom-direction).

In various embodiments, as shown in FIG. 6D, the antenna 102 may be arranged as two or more antenna portions 102_1, 102_2 between multiple pairs of metal rings, e.g. with the first antenna portion 102_1 between the first metal ring 220_1 and the second metal ring 220_2, and with the second antenna portion 102_2 between the second metal ring 220_2 and the third metal ring 220_3. A connection 102c between the first antenna portion 102_1 and the second antenna portion 102_2 may in various embodiments be provided, for example in the gap 222. In various embodiments, the antenna 102 having the two (or more) antenna portions 102_1, 102_2 may for example have more flexibility (e.g. allow for a higher total number of windings) for adjusting the antenna 102 parameters, e.g. the resonance frequency.

In various embodiments, an electrically insulating material 224 may be arranged around the antenna 102 and/or between individual windings of the antenna 102 and/or between adjacent metal rings 220 of the plurality of metal rings 220 and/or around the chip 106, for example as an electrically insulating encapsulation. The electrically insulating material 224 may for example include or consist of a plastic material and/or a ceramic material. The electrically insulating material 224 may in various embodiments include or consist of the same material as the filler 440. In various embodiments, the electrically insulating material 224 may be different from the filler 440. In various embodiments, the electrically insulating material 224 may be an electrically insulating glue, which may be configured to join two adjacent metal rings 220 of the plurality of metal rings 220 and/or to fix the antenna 102 to the at least one metal ring 220. In the exemplary embodiments of FIGS. 6A, 6B, and 6E, the electrically insulating material 224 may for example be used for fixing the antenna 102 in the respective recess 660 of the NFC rings 200d, 200e, and 200h, respectively. In the exemplary embodiments of FIGS. 6C and 6D, the electrically insulating material 224 may for example be used for fixing the antenna 102 to the first and/or the second metal ring 220_1, 220_2, respectively. Additionally, the insulating material 224 may attach the first metal ring 220_1 to the second metal ring 220_2.

The electrically insulating material 224 may also be arranged around the antenna 102 and/or the chip 106 of FIG. 2A and FIG. 2B, for example as an encapsulation insulating and protecting the antenna 102 and/or the chip 106, even though it is not shown there.

In various embodiments, the antenna 102 may be pre-arranged on a carrier 664, e.g. an electrically insulating carrier 664. The carrier 664 may be flexible, e.g. a plastic sheet or the like, for example as known in the art. Thereby, a forming of the antenna 102 may be facilitated. For example, it may otherwise be difficult to lay the individual windings of the antenna coil 102 on an inside of the metal ring 220, as shown in the exemplary embodiments of FIGS. 6A and 6B showing NFC rings 200d and 200e, respectively.

In the NFC ring 200e of FIG. 6B, the recess 660 may be larger in an enlarged region, and the chip 106 may be arranged in the enlarged region, whereas in FIG. 6A, the chip 106 may be arranged in the gap 222 of the NFC ring 200d, which is indicated by the cross-sectional view showing the chip 106 and its connections 662 to the antenna 102 as solid lines, while showing the metal ring 220 in a left portion of FIG. 6A as a dashed line.

FIG. 5 shows test measurement arrangements 501, 502 and 503 for measuring a load modulation amplitude, and, in graph 500, results of test measurements of the load modulation amplitude conducted using the test measurement arrangements 501, 502 and 503.

In the test measurement arrangement 501, a common NFC ring 101, which may differ from the NFC ring 100 of FIG. 1 by additionally including an encapsulation, is arranged for a near field communication with an external device while having the load modulation amplitude measured.

In the test measurement arrangement 502, three closed metal rings are stacked on the common NFC ring 101, thereby forming a comparison example NFC ring 550. The comparison example NFC ring 550 is arranged for a near field communication with the external device while having the load modulation amplitude measured.

In the test measurement arrangement 503, the NFC ring 200a from FIG. 2A, including three stacked metal rings, each of which having an isolation gap (which may be formed as a small gap), wherein the metal rings are electrically insulated from each other, e.g. by an isolation layer arranged between each pair of metal rings. The antenna and the chip may be arranged like the common NFC ring 101, which may form an aesthetically less favorable embodiment, but may allow for best comparability with the measurements of the common NFC ring 101 and of the comparison example NFC ring 550. The NFC ring 200a is arranged for a near field communication with the external device while having the load modulation amplitude measured.

In the measurements, an influence of the proposed solution is demonstrated.

Graph 500 of FIG. 5 illustrates the measurement result of the measurements conducted using the described measurement arrangements 501, 502 and 503 as load modulation amplitude LMA (in units of peak voltage Vp) as a function of field strength H (in units of a percentage of reader maximum power).

The measurement for the common NFC ring 101 may be considered an optimal performance.

As it can be seen in graph 500, there is essentially no difference (or at least no significant difference) between the load modulation amplitude analyses of the common NFC ring 101 (measurements 552 and 556, respectively) compared to the NFC ring 200a in accordance with various embodiments, i.e. having the proposed metal structure of the at least one metal ring having the gap (measurements 554, 558). For both, the common NFC ring 101 and the NFC ring 200a in accordance with various embodiments, the measurements start around 48% of the provided field strength. In other words, a minimum operating field strength of the NFC ring 200a in accordance with various embodiments is similar to the common NFC ring 101, while providing a more robust structure.

A load modulation amplitude measured for the NFC ring 200a in accordance with various embodiments may be essentially the same as for the common NFC ring (measurements 558 and 556, respectively), or may be only slightly smaller (measurements 554 and 552, respectively), wherein the measurements 552, 554 are for a lower sideband and the measurements 556, 558 are for an upper sideband.

A minimum operating field strength of the comparison example NFC ring 550 (including the three solid (i.e. closed) metal rings) is increased to 74%. Furthermore, a Load modulation Amplitude is decreased for the comparison example NFC ring 550 as compared to both, the common NFC ring 101 and the NFC ring 200a in accordance with various embodiments. As can be seen, an overall performance of the comparison example NFC ring 550 is significant influenced (in a negative way) by the closed coupled metal loop.

The measurement results may be understood as showing that eddy currents may be induced in the closed metal rings (i.e., conductor loops) of the comparison example NFC ring 550, in a plane perpendicular to a magnetic field, which may diminish/decrease a performance of the NFC ring 550.

As opposed to this, due to an absence of metal rings in the common NFC ring 101, no eddy currents are induced therein, leading to an optimal performance, and the metal rings of the NFC ring 200a in accordance with various embodiments may, due to the gap, be formed in such a way that eddy currents may not form in the open metal rings of the NFC ring 200a in accordance with various embodiments, such that the performance is almost the same as for the common NFC ring 101.

Shown embodiments are meant to be only exemplary. Any combination of arrangements of the antenna 102 and the chip 106 on the at least one metal ring 220 with the gap 222 may be possible, for example having the antenna 102 on an inside and/or an outside and/or one or more side surface(s) of the at least one metal ring 220 with the gap 222, wherein the antenna 102 (which may also include a plurality of antenna portions) be arranged in recesses or on the outer surface of the at least one metal ring 220 with the gap 222, and wherein the antenna 102 on the side surface(s) may be arranged on an outer surface of the metal ring 220 or between two metal rings 220. The chip 106 may be arranged in a recess 660, in the gap 222, under or on top of the antenna 102, or in any other position on the metal ring 220 with the gap 222 where it may be protected by the metal ring 220 and/or by an (electrically insulating) encapsulation. Any of the antenna 102 positions may be combined with any of the chip 106 positions.

Figure 8:
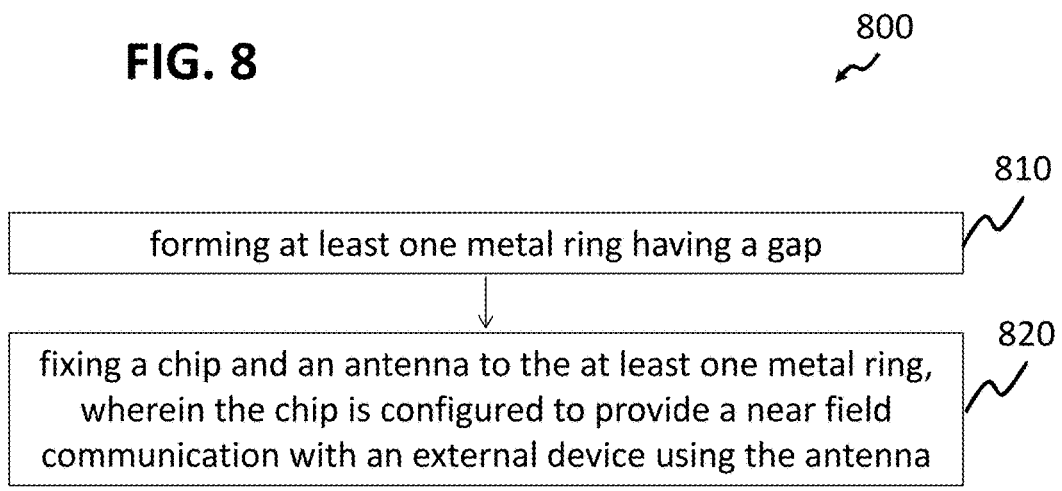
FIG. 8 shows a flow diagram of a method of forming an NFC ring in accordance with various embodiments.

FIG. 8 shows a flow diagram 800 of a method of forming an NFC ring in accordance with various embodiments.

In various embodiments, a method of forming a near field communication ring configured to be worn by a user is provided. The method may include forming at least one metal ring having a gap (in 810) and fixing a chip and an antenna to the at least one metal ring, wherein the chip may be configured to provide a near field communication with an external device using the antenna (in 820).

In various embodiments, a near field communication ring configured to be worn by a user is provided. The NFC ring may include at least one metal ring having a gap, a chip, and an antenna, wherein the chip and the antenna may be fixed to the at least one metal ring having a gap, and wherein the chip, using the antenna, is configured to provide a near field communication with an external device.

In various embodiments, the gap may be filled by a filling, wherein the filling may include an electrically insulating material.

In various embodiments, the at least one metal ring having a gap may include a plurality of metal rings, each of which having a gap.

In various embodiments, each of the metal rings may have a central axis, wherein the plurality of metal rings may be stacked such that the central axes coincide.

In various embodiments, at least two of the metal rings may be arranged with their respective gaps in different circumferential positions.

In various embodiments, each metal ring of the plurality of metal rings may be electrically insulated from each of the other metal rings by an insulating material.

In various embodiments, the insulating material may be an electrically insulating glue.

In various embodiments, the chip may be arranged in the gap.

In various embodiments, the antenna may be arranged between two metal rings of the plurality of metal rings.

In various embodiments, the gap may be formed such that the at least one metal ring is an open ring having a first end at a first side of the gap and a second end at a second side of the gap.

In various embodiments, the gap may have a width in a range from 0.1 mm to 1 cm.

In various embodiments, the metal may include at least one of a group of metals, the group including silver, gold, platinum, titanium, copper, iron, aluminum, palladium, and an alloy of at least two of the above metals.

In various embodiments, a method of forming a near field communication ring configured to be worn by a user is provided. The method may include forming at least one metal ring having a gap, and fixing a chip and an antenna to the at least one metal ring, wherein the chip is configured to provide a near field communication with an external device using the antenna.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A near field communication ring configured to be worn by a user, comprising:
    at least one metal ring having a gap;
    a chip; and
    an antenna, wherein the chip and the antenna are fixed to the at least one metal ring having a gap;
    wherein the chip, using the antenna, is configured to provide a near field communication with an external device, and
    wherein the gap is an isolation gap configured to reduce induction of eddy currents in the at least one ring.
2. The near field communication ring of claim 1, wherein the at least one metal ring having a gap comprises a plurality of metal rings, each of which having a gap.
3. The near field communication ring of claim 2, wherein each of the metal rings has a central axis, and wherein the plurality of metal rings is stacked such that the central axes coincide.
4. The near field communication ring of claim 2, wherein at least two of the metal rings are arranged with their respective gaps in different circumferential positions.
5. The near field communication ring of claim 2, wherein each metal ring of the plurality of metal rings is electrically insulated from each of the other metal rings by an insulating material.
6. The near field communication ring of claim 5, wherein the insulating material is an electrically insulating glue.
7. The near field communication ring of claim 1, wherein the chip is arranged in the gap.
8. The near field communication ring of claim 2, wherein the antenna is arranged between two metal rings of the plurality of metal rings.
9. The near field communication ring of claim 1, wherein the gap is formed such that the at least one metal ring is an open ring having a first end at a first side of the gap and a second end at a second side of the gap.
10. The near field communication ring of claim 1, wherein the gap has a width in a range from 0.1 mm to 1 cm.
11. The near field communication ring of claim 1, wherein the metal comprises at least one of a group of metals, the group comprising:
    silver;
    gold;
    platinum;
    titanium;

copper;
iron;
aluminum; and
an alloy of at least two of the above metals.

12. Method of forming a near field communication ring configured to be worn by a user, comprising:
- forming at least one metal ring having a gap;
- fixing a chip and an antenna to the at least one metal ring,
- wherein the chip is configured to provide a near field communication with an external device using the antenna, and
- wherein the gap is an isolation gap configured to reduce induction of eddy currents in the at least one ring.

13. A near field communication ring configured to be worn by a user, comprising:
- at least one metal ring having a gap;
- a chip; and
- an antenna, wherein the chip and the antenna are fixed to the at least one metal ring having a gap;
- wherein the chip, using the antenna, is configured to provide a near field communication with an external device, and
- wherein the gap is filled by a filling, the filling comprising an electrically insulating material.

* * * * *